(12) United States Patent
Cavalli

(10) Patent No.: US 11,235,746 B2
(45) Date of Patent: Feb. 1, 2022

(54) SYSTEM, METHOD AND MULTI-FUNCTION APPARATUS TO DETERMINE THE PROFILE OF A BRAKE DISK AND OF A TYRE OF A VEHICLE

(71) Applicant: TEXA S.P.A., Monastier di Treviso (IT)

(72) Inventor: Manuele Cavalli, Musestre di Roncade (IT)

(73) Assignee: TEXA S.P.A., Monastier di Treviso (IT)

(*) Notice: Subject to any disclaimer, the term of this patent is extended or adjusted under 35 U.S.C. 154(b) by 191 days.

(21) Appl. No.: 16/496,812

(22) PCT Filed: Mar. 23, 2018

(86) PCT No.: PCT/IB2018/051986
§ 371 (c)(1),
(2) Date: Sep. 23, 2019

(87) PCT Pub. No.: WO2018/172991
PCT Pub. Date: Sep. 27, 2018

(65) Prior Publication Data
US 2021/0101577 A1 Apr. 8, 2021

(30) Foreign Application Priority Data
Mar. 24, 2017 (IT) .......................... 102017000032900

(51) Int. Cl.
*G01M 17/02* (2006.01)
*B60T 17/22* (2006.01)
(Continued)

(52) U.S. Cl.
CPC .......... *B60T 17/221* (2013.01); *F16D 66/028* (2013.01); *F16D 65/0043* (2013.01);
(Continued)

(58) Field of Classification Search
CPC ....... B60T 17/22; B60T 17/221; G01B 11/06; G01B 11/24; G01M 17/027; F16D 65/0043; F16D 66/028
See application file for complete search history.

(56) References Cited

U.S. PATENT DOCUMENTS

| 5,054,918 A | 10/1991 | Downing et al. |
| 5,895,845 A | 4/1999 | Bueger |
| (Continued) | | |

FOREIGN PATENT DOCUMENTS

| EP | 2913653 A1 | 9/2015 |
| WO | WO-2015111031 A2 | 7/2015 |

OTHER PUBLICATIONS

International Search Report and Written Opinion in corresponding PCT Application No. PCT/IB2018/051986, dated Jun. 5, 2018.

*Primary Examiner* — Eric S. McCall
(74) *Attorney, Agent, or Firm* — Leason Ellis LLP

(57) ABSTRACT

A multi-function portable optoelectronic apparatus to determine the profile of a brake disk and the profile of the tread of a tyre comprising an optoelectronic assembly for emitting a laminar beam of light along an optical emission axis so as to project onto the brake disk or onto the tread a luminous line and acquire an image containing the projected luminous line, a tubular case which can be gripped by hand, which contains optoelectronic assembly and is designed to be arranged resting on the brake disk during determination of the profile of the brake disk and an angular adapter member designed to be coupled in a stable but easily removable manner to the case and shaped to be arranged resting on the tread during determination of the profile of the tread; an electronic system configured to receive the image and determine the profile of the brake disk or the profile of the tread on the basis of the luminous line contained in the image.

10 Claims, 8 Drawing Sheets

(51) Int. Cl.
*F16D 66/02* (2006.01)
*F16D 65/00* (2006.01)
*G01B 11/25* (2006.01)
*G07C 5/00* (2006.01)

(52) U.S. Cl.
CPC .......... *G01B 11/25* (2013.01); *G01M 17/027* (2013.01); *G07C 5/006* (2013.01)

(56) References Cited

U.S. PATENT DOCUMENTS

| | | | |
|---|---|---|---|
| 5,936,155 A * | 8/1999 | Francois | B60C 23/043 |
| | | | 73/129 |
| 10,041,556 B2 * | 8/2018 | Cavalli | G01B 11/167 |
| 10,275,662 B1 * | 4/2019 | Askeland | G06T 7/40 |
| 11,001,399 B2 * | 5/2021 | Arribe | G06T 7/0004 |
| 2012/0008148 A1 | 1/2012 | Pryce et al. | |
| 2014/0259719 A1 | 9/2014 | Thorley et al. | |
| 2017/0002884 A1 * | 1/2017 | Cavalli | B60T 17/221 |

* cited by examiner

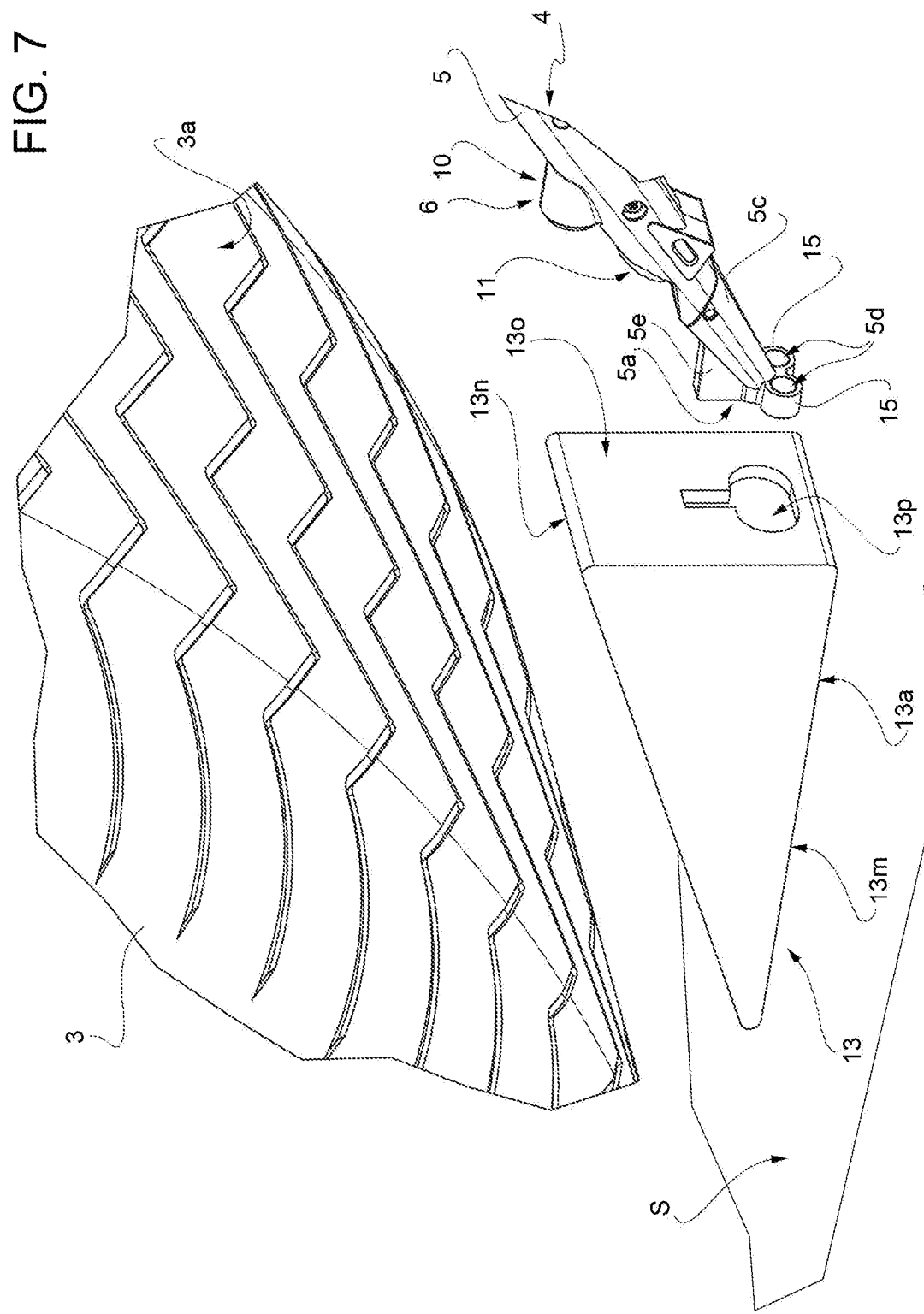

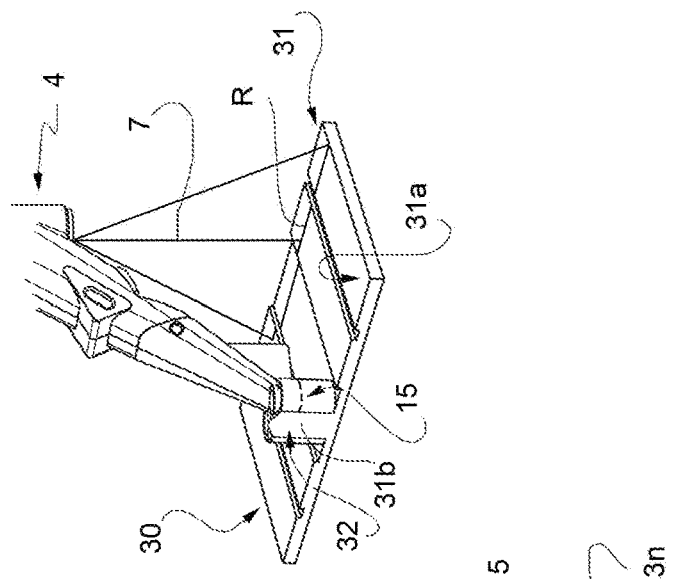
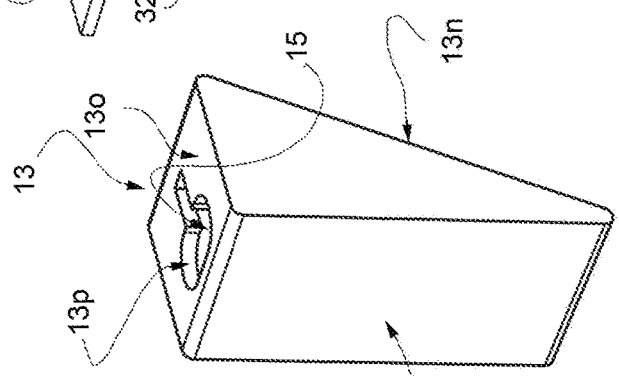
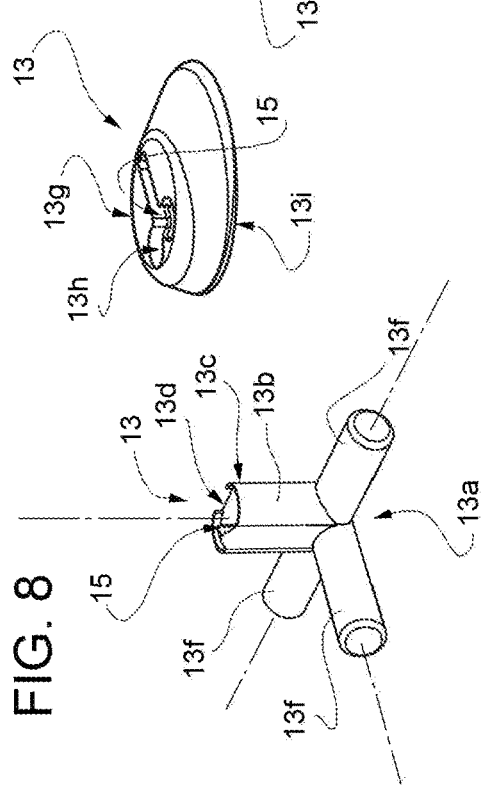

SYSTEM, METHOD AND MULTI-FUNCTION APPARATUS TO DETERMINE THE PROFILE OF A BRAKE DISK AND OF A TYRE OF A VEHICLE

CROSS-REFERENCE TO RELATED PATENT APPLICATIONS

This application is a U.S. National Phase Application under 35 U.S.C. § 371 of International Patent Application No. PCT/IB2018/051986, filed on Mar. 23, 2018, which claims priority from Italian Patent Application No. 102017000032900 filed on Mar. 24, 2017, the disclosure of each of which is incorporated by reference.

TECHNICAL FIELD

The present invention relates to a system, method, and multi-function apparatus to determine the profile of a brake disk (disk brake) and the profile of a tyre of a vehicle. In particular, the present invention relates to a multi-function system provided with a portable optoelectronic apparatus, easy to grip by an operator and manually adjustable by the same to determine the profile of a brake disk of a braking system of a vehicle and the tread profile of a tyre mounted on a wheel of a vehicle, preferably a motor vehicle; which the following description will make explicit reference to without thereby detracting from its generality.

BACKGROUND ART

Optoelectronic systems designed to determine the profile of a tread based on the processing of a luminous line projected onto said tread are known. For example, U.S. Pat. No. 5,054,918 and the Patent Application EP 2 913 653 describe optoelectronic systems designed to project a blade of light against the tread of a tyre made to rotate, repeatedly capture the images of the line projected on the tread and map the profile of the entire tread based on the images captured.

Optoelectronic tools for determining the state of deterioration of a brake disk of a vehicle based on a luminous beam projected onto said brake disk are also known. An optoelectronic instrument of this type is described, for example, in Patent Application No. WO 2015 111 031 filed by the Applicant.

However, in recent times, the need has arisen, especially among car mechanics, to have a single portable device, which is multi-functional, i.e. allows an operator to selectively determine both the profile of a brake disk and the profile of a tyre. Such tools also needs to be easily usable directly on a tyre or on a brake disk mounted on the vehicle, without the need to remove the same and/or to rotate them during the measurement.

The Applicant has therefore conducted an in-depth study aimed at identifying a solution to overcome the technical problems and meet the requirements described above.

DISCLOSURE OF INVENTION

The object of the present invention is therefore to provide a solution to achieve the above-mentioned objective.

This object is achieved by the present invention inasmuch as relative to a system, method and a multi-function apparatus designed to selectively determine the profile of a brake disk and the profile of a tyre, as defined in the appended claims.

BRIEF DESCRIPTION OF THE DRAWINGS

The present invention will now be described with reference to the appended drawings, which illustrate a non-limiting embodiment, wherein:

FIG. 7 is a perspective view of the multi-function apparatus provided with an angular adaptor device made according to a variant;

FIGS. 8, 9, and 10 are perspective views of as many angular adaptors of the multi-function apparatus made according to the present invention; while FIG. 11 is a perspective view of a calibration module of the multi-function apparatus made according to the present invention.

BEST MODE FOR CARRYING OUT THE INVENTION

The present invention will now be described in detail with reference to the accompanying drawings in order to allow a skilled person to implement it and use it. Various modifications to the described embodiments will be readily apparent to the skilled people and the general principles described may be applied to other embodiments and applications without however departing from the protective scope of the present invention as defined in the appended claims. Therefore, the present invention should not be regarded as limited to the embodiments described and illustrated herein, but it must be given the broadest protective scope consistent with the principles and features described and claimed herein.

Figure 1:
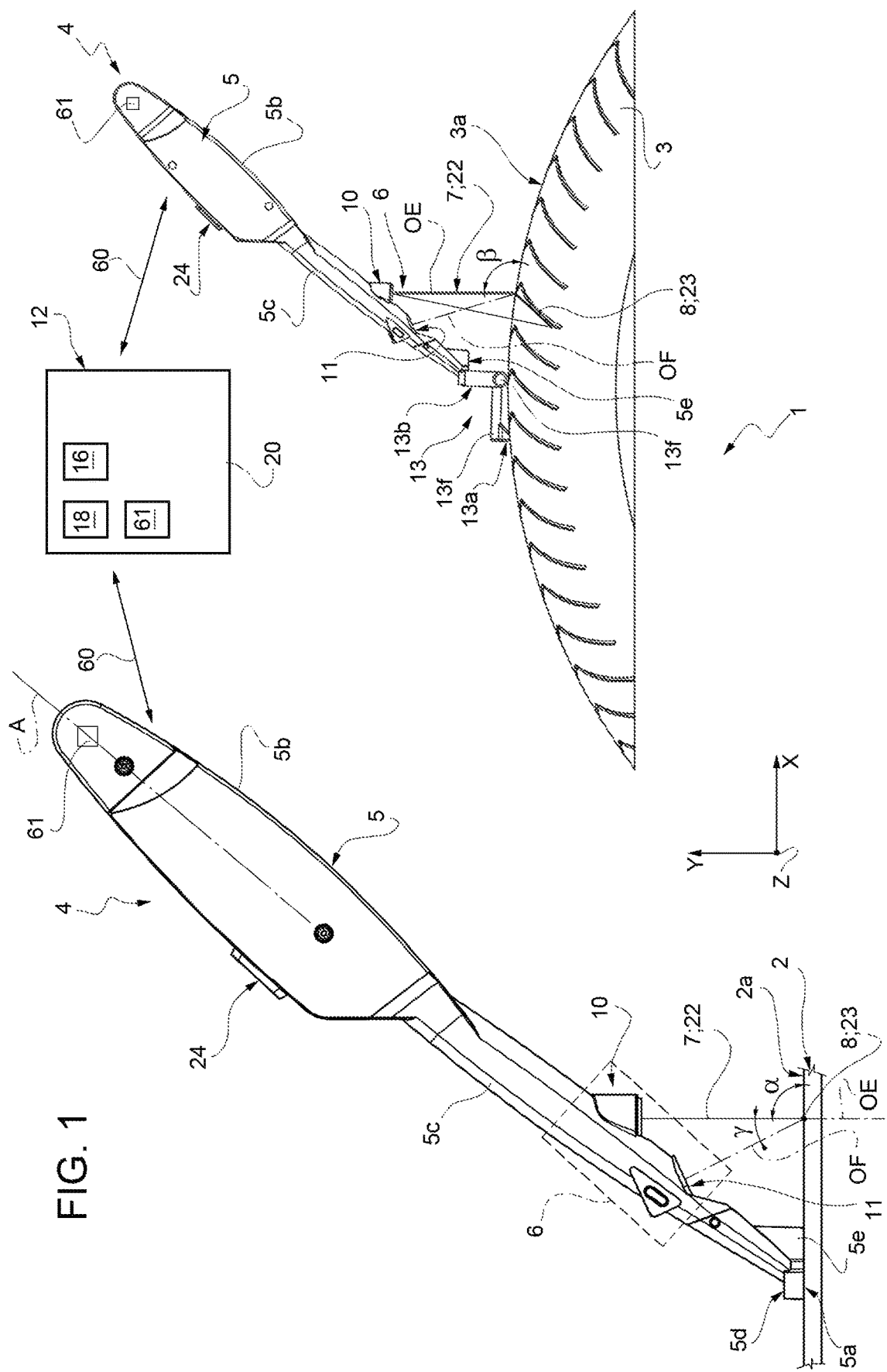
FIG. 1 schematically shows a multi-function system to determine the profile of a brake disk and the profile of a tyre made according to the present invention.

With reference to FIG. 1, number 1 indicates, as a whole, a multi-function system 1 configured to determine the profile of a brake disk 2. Conveniently, the multi-function system 1 is also configured to determine the tread profile 3a of a tyre 3. Conveniently, the system 1 can be configured to selectively determine the tread profile 3a of the tyre 3 and the profile of the brake disk 2. It is understood that "profile of a brake disk" means a surface profile, approximately radial, of the brake disk, i.e. the profile determined along a radius or a directrix line extending along the greatest surface of the brake disk 2 itself (FIG. 3).

Figure 2:
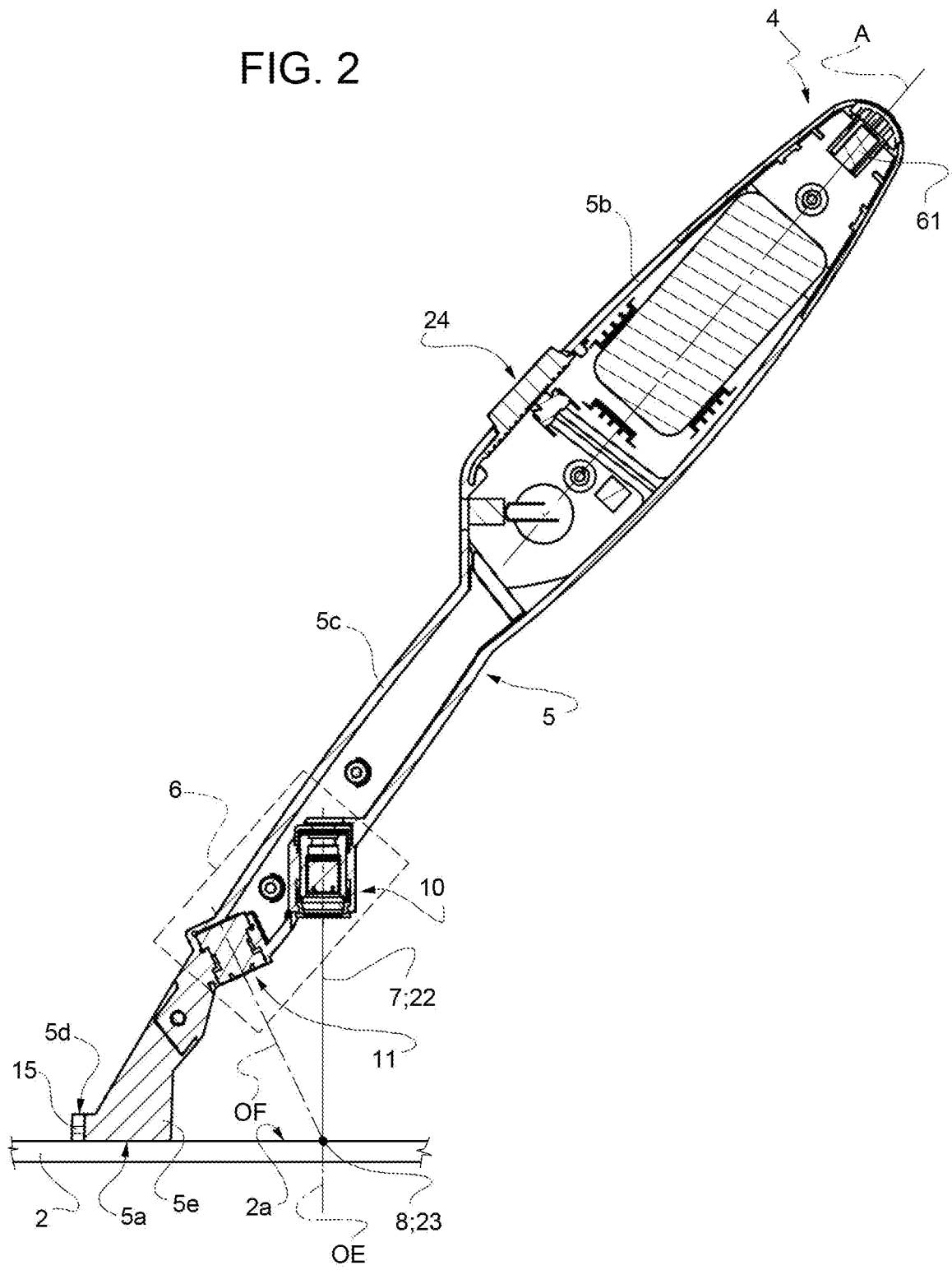
FIG. 2 is a schematic view in lateral elevation with parts in cross-section and parts removed for clarity, of a multi-function apparatus included in the system, in a configuration designed to determine the profile of a brake disk.
Figure 3:
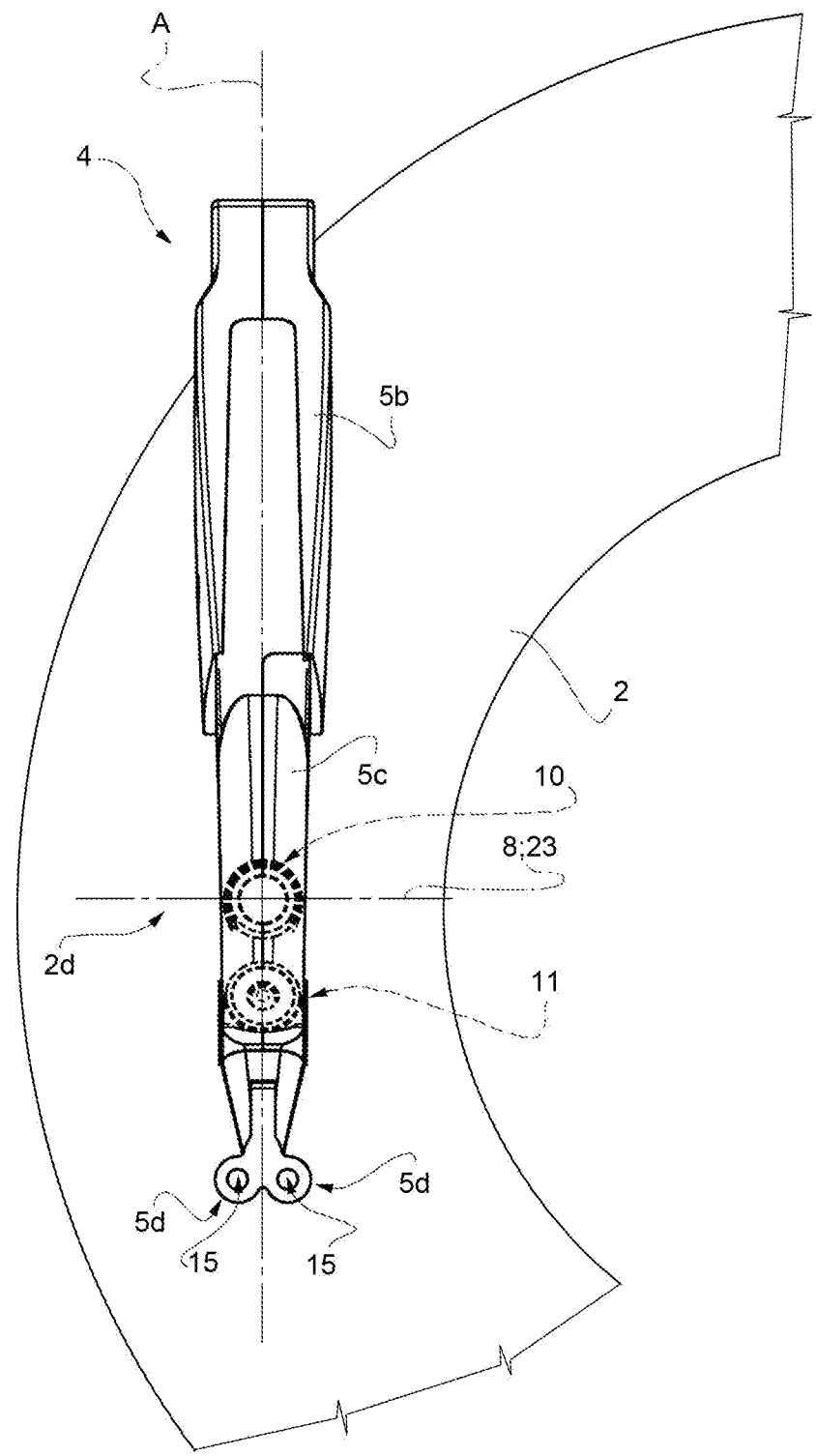
FIG. 3 is a plan view of the multi-function apparatus in the configuration designed to determine the profile of a brake disk.
Figure 5:
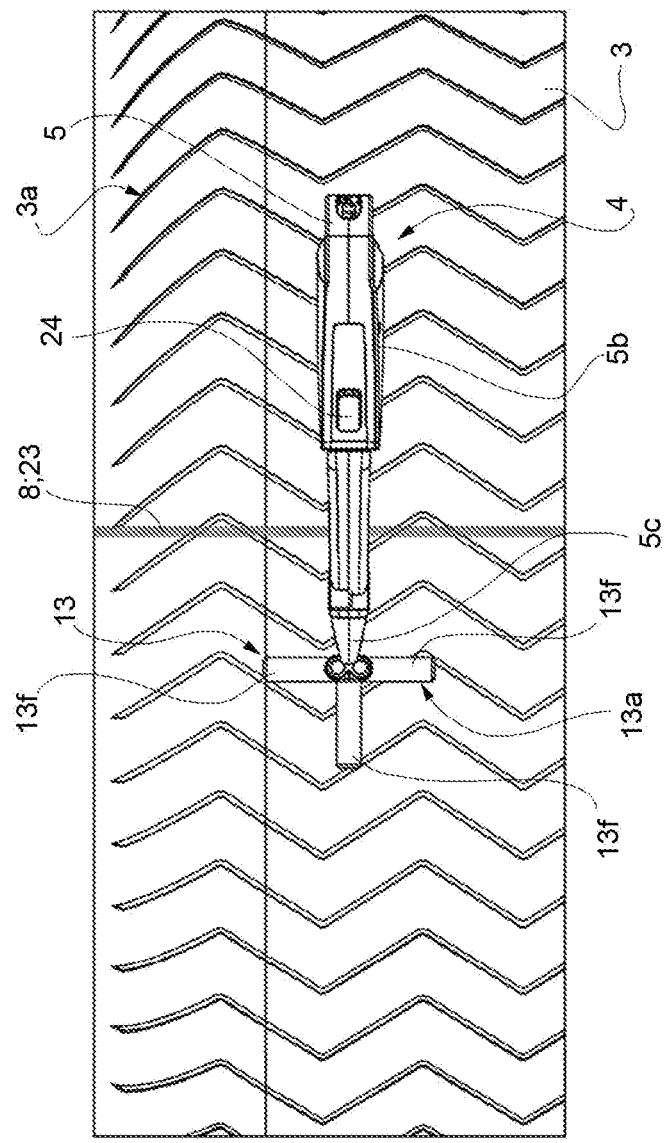
FIG. 5 is a plan view of the multi-function apparatus shown in FIG. 4.

As shown in the example in FIGS. 1, 2 and 3, the multi-function system 1 is provided with a portable multi-function optoelectronic apparatus 4 comprising an optoelectronic system or group 6, which is configured to emit at least a beam of light 7 along an optical emission axis OE in order to project a relative luminous line 8 on the brake disk 2 or on the tread 3a (FIG. 5). The optoelectronic assembly 6 may also be configured in such a way as to capture, i.e. acquire an image containing the luminous line 8 projected onto the brake disk 2 or tread 3a.

The optoelectronic apparatus 4 further comprises a housing or frame or outer case 5 structured so as to contain the optoelectronic assembly 6 and so as to be used manually (e.g. gripped) by an operator. According to a preferred embodiment shown in FIG. 2, the case 5 conveniently presents a supporting surface 5a, which is designed to be arranged in abutment/resting on the brake disk 2, and is shaped so that when the supporting surface 5a is in abutment/resting on the brake disk 2, the optical emission axis OE forms a predetermined angle of incidence α with the brake disk 2.

The portable optoelectronic apparatus 4 further comprises an angular adapter member or device 13, designed to be coupled in a stable (i.e. fixed) but easily removable manner (i.e. detachable or easy to uncouple) to said case 5 to be arranged resting on the tread 3a during determination of the profile of the tread 3a. The angular adapter member 13 is structured in such a way that when it is arranged resting on the tread 3a, the optical emission axis OE forms a predetermined angle of incidence β, with respect to said tread 3a.

The angular adapter member 13 allows the technical effect/advantage to be obtained of enabling the operator to use a single optoelectronic apparatus 4 to determine both the brake disk profile 2 and the tread profile 3a. Conveniently, the angle of incidence β, of the optical emission axis OE is approximately 90° (for instance, in the reference system xyz shown in FIG. 1).

The multi-function system 1 further comprises an electronic processing system 12, which is configured so as to receive from the optoelectronic assembly 6 the image of the brake disk 2 or the image of the tread 3 according to the function implemented. Conveniently, the electronic processing system 12 may be configured to process the image received to determine the profile of the brake disk 2. Conveniently, the electronic processing system 12 may also be configured to process the image received to determine the tread profile 3a. Conveniently, the electronic processing system 12 may also be configured to determine the profile of the brake disk 2 and the profile of the tread 3a based on the luminous line 8 contained in the relative image. Conveniently, the electronic processing system 12 may be configured to determine the luminous line 8 by implementing a digital processing algorithm of the captured image. Conveniently, the electronic system 12 may also be configured so as to determine the information indicating the brake disk condition 2 based on the brake disk profile 2. Conveniently, the information indicative of the brake disk condition may include information indicative of the brake disk wear condition. Conveniently, the information indicative of the brake disk condition 2 may include a fault and/or damage and/or consumption condition of the brake disk 2. These conditions can be determined by a brake disk analysis algorithm based on the presence of at least one surface irregularity on the brake disk. It should be specified that, according to the present invention, the term "brake disk" and "surface irregularity of the brake disk", also refers to the definition in Patent Application n. WO 2015 111 031 of the Applicant, the content of which is fully incorporated in the present application as reference. Conveniently, a brake disk analysis algorithm implemented by the electronic system 12 could also implement operations and provide data as, for example, described in the Patent Application n. WO 2015 111 031 of the Applicant, the content of which is incorporated in the present application as a reference.

Conveniently, the electronic system 12 may also be configured in such a way as to determine the information indicative of the tyre/tread condition based on the tread profile 3a. Conveniently, the information indicative of the tread condition 3a may include information indicative of the state of wear of the tread 3a. Conveniently, the information indicative of the condition of the tread 3a may include a fault and/or damage and/or consumption condition of the tread 3a. Conveniently, the electronic system 12 may be configured in such a way as to determine the state of wear of the tread 3a by processing the luminous line 8 using a tyre wear analysis algorithm. Conveniently, the algorithm can be structured so as to determine the tread profile 3a based on the luminous line 8. Conveniently, the algorithm can be structured so as to measure/calculate one or more distances between one or more predetermined points of the tread profile 3a and determine the state of wear of the tread 3a based on said distances. For example, a calculated distance may correspond to the radial height of at least one tread 3a recess, and the algorithm can conveniently determine the state of wear of the tread 3a based on the radial height measured. For example, the algorithm may determine the state of wear of the tread 3a based on the outcome of a comparison between at least one measured radial height and a relative numerical threshold, which could conveniently derive from consumption data provided by the tyre manufacturer.

With reference to the preferred exemplary embodiment shown in FIGS. 1 and 2, the optoelectronic assembly 6 comprises a light emitting device 10 configured to emit/generate a luminous beam 7. Conveniently, the light beam 7 may be collimated along the optical emission axis OE. Conveniently, the light beam 7 may be collimated on a plane in order to be laminar and divergent, i.e. it can form a light fan that traces the luminous line 8 on the surface struck. The light emitter device 10 may preferably comprise a LASER light source or any similar source.

With reference to the preferred exemplary embodiment shown in FIGS. 1 and 2, the optoelectronic assembly 6 further comprises a sensor device 11 having a focal axis OF and configured to acquire/capture said image containing the luminous line 8 projected onto the surface to be examined 2a of the brake disk 2 or the tread 3a, and provide an electrical signal/indicative data of the captured image. Conveniently, the optoelectronic assembly 6 is structured so that the angle γ present between the optical axis OE and the focal axis OF is between about 20° and 30°, preferably about 25°. Conveniently, the sensor device 11 may be incorporated/arranged in the case 5 so that its photo-sensitive surface is facing the surface of the brake disk 2 or tread 3a. Conveniently, the sensor device 11 may comprise an imaging device such as a micro camera. It should be clarified that, according to the present invention, the light source and/or sensor device may conveniently be realized as described in Patent Application n. WO 2015 111 031 of the Applicant, the content of which is fully incorporated in the present application as reference.

With reference to the preferred exemplary embodiment shown in FIGS. 1 and 2, the case 5 may have a preferably tubular shape. Conveniently, the case 5 may preferably be formed of an oblong cylindrical body, conveniently monolithic that extends along a longitudinal axis A. Conveniently, the case 5 can be made of plastic and/or metal or similar materials. Conveniently, the supporting surface 5a of the case 5 may preferably be made at the axial end of the case 5. According to a preferred exemplary embodiment shown in FIGS. 1 and 2, the axial end of the case 5 (the lower end in said Figures) is chamfered so as to present an approximately flat supporting surface 5a. The supporting surface 5a is made on the axial end of the case 5 so that when said axial end is arranged in abutment with the supporting surface 5a abutting on the brake disk 2, the angle α of the optical emission axis OE is approximately 90° (in the reference system xyz shown in FIG. 1) relative to the surface 2a.

The supporting surface 5a made on the axial end of the case 5 has the technical effect of simplifying for the operator the correct manual positioning of the apparatus 1 in which on one side the light beam 7 is approximately perpendicular to the surface of the brake disk 2 and on the other side the focusing of the sensor device 11 is optimal.

According to a preferred exemplary embodiment shown in FIGS. 1 and 2, the case 5 may conveniently comprise two axially connected tubular portions. Conveniently a tubular portion 5b may comprise an enlarged, roughly cylindrical shaped tube (upper in FIGS. 1 and 2), extending along the A-axis and externally shaped to form the manual grip of the apparatus 4. The other tubular portion 5c (lower in FIGS. 1 and 2), may instead conveniently be shaped in such a way as to form a stem which extends cantilevered from the portion 5b and extends along the longitudinal axis A. In the example illustrated, the supporting surface 5a is made on the free distal end of the stem of the tubular portion 5c (lower in FIG. 1) opposite the tubular portion 5b. Conveniently, the stem can house the optoelectronic assembly 6.

According to a preferred exemplary embodiment shown in FIGS. 1, 2 and 3, the axial end of the case 5 may comprise cylindrical bodies 5d, the bases of which, preferably flat and coplanar with each other, form the supporting surface 5a. Conveniently, the case 5 may comprise two cylindrical bodies 5d juxtaposed and symmetrical to each other with respect to the centreline of the case 5. When in use, the axial end of the case 5 is arranged in abutment on the brake disk 5, the bases of the cylindrical bodies 5d are fully resting on the surface of the brake disk 2, conveniently preventing the swivelling of the apparatus 1 from the centreline plane (parallel to the plane xy in FIG. 1 and passing through the axis A) of the case 5.

Conveniently, the axial end of the case 5 may further comprise a posterior stabiliser plate or flap 5e preferably of a triangular shape designed, in use, to position itself with a lower side resting on the brake disk 2 to prevent the swivelling of the apparatus 1 around an axis orthogonal to the centreline and to the axis A. As shown in the example illustrated, the flap 5e may extend centrally from the case 5 on the opposite side to the cylindrical bodies 5d so as to lie approximately in the centreline of the casing 5. The flap 5e has a lower side designed to be placed in abutment on the brake disk 2, which is approximately straight and coplanar to the lower flat bases of the cylindrical bodies 5d.

With reference to FIGS. 1, 4, 5 and 8, the angular adapter member 13 may comprise a monolithic body that has a supporting portion 13a to be arranged in abutment on the tread 3a. According to a possible embodiment, the supporting portion 13a may be approximately T-shaped (horizontal portion in FIGS. 1, 4, 5 and 8). Conveniently, the elements that form the T-shaped supporting portion 13a may comprise at least two about tubular, elongated supporting bodies 13f, preferably orthogonal to each other. Conveniently, the supporting bodies 13f may comprise rods having an approximately circular or quadrangular or similar cross-section. Conveniently, the diameter and/or length of the supporting bodies 13f can be varied depending on the recesses/mould of the tread 3a of the tyre 3 so as to ensure the angular stability of the apparatus 4 when resting on the tread 3a. Conveniently, the angular adapter member 13 may comprise a central connecting portion 13b, for example column-shaped, which is connected to the supporting portion 13a, and is structured in such a way as to be coupled in a stable but easily removable manner to the case 5. Conveniently, the central connecting portion 13b may extend along an axis approximately orthogonal to the lying plane of the supporting portion 13a. Conveniently, the central connecting portion 13b may have a free end 13c, opposite the supporting portion 13a, shaped to be manually coupled in a stable but easily removable manner (separable) to the axial end of the case 5. Preferably, the free end 13c may be arranged above and comprise a seat 13d designed to house the axial end of the case 5. Conveniently, the seat 13d can be shaped in a complementary manner to the cylindrical bodies 5d so as to house them.

Figure 6:
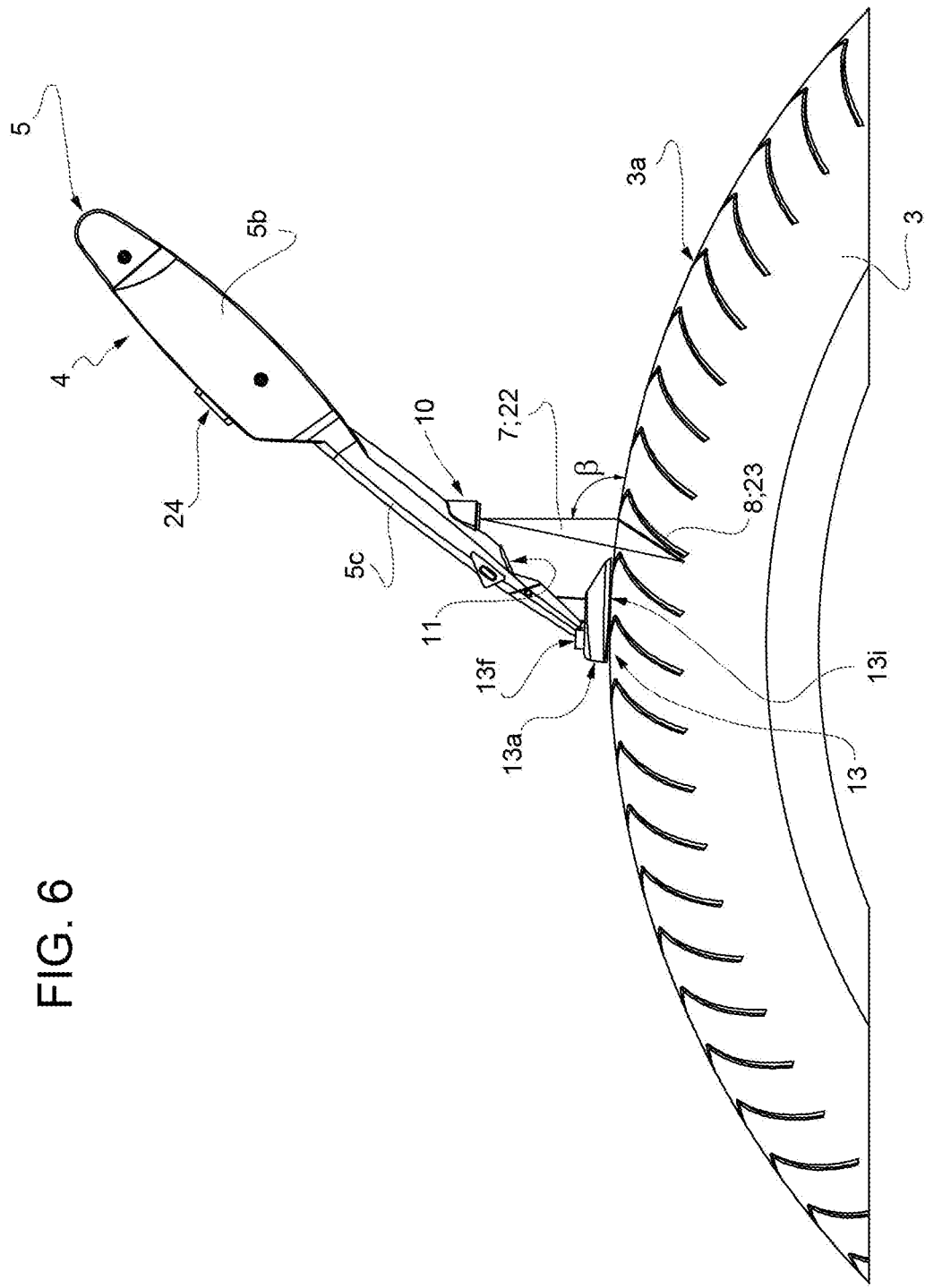
FIG. 6 is a side elevation view of the multi-function apparatus provided with an angular adaptor device made according to a variant.

With reference to FIGS. 6 and 9, the supporting portion 13a may comprise, as an alternative to the T-shaped body, a discoid body. Preferably, the top face 13g of the discoid body can be shaped to be manually coupled but easily removable (separable) from the case 5. Preferably, on the top face 13g of the discoid body (FIG. 9) a coupling seat 13h of an approximately complementary shape to the axial end of the case 5 may be made to house the same. Conveniently, the lower face 13i of the discoid body is designed in use to be arranged resting on the tread 3a. Preferably, the coupling seat 13h of the discoid body can be shaped in a complementary manner to the cylindrical bodies 5d and the flap 5e so as to house them.

With reference to FIGS. 7 and 10, the supporting portion 13a may comprise, as an alternative to the T-shaped body and to the discoid body, a monolithic wedge-shaped body. The monolithic wedge-shaped body can be shaped in such a way as to engage/wedge in use between the tyre and the supporting surface S of the tyre 3. Conveniently, the monolithic wedge-shaped body has a lower supporting side 13m (in FIG. 7) designed to be arranged in abutment on the supporting surface of the tyre 3, an inclined side 13n forming the abutment surface against the tyre 3, and a connecting side 13o designed to be connected in a stable but easily removable manner to the case 5. On the connecting side 13o a seat 13p may be conveniently made for the coupling of the monolithic body to the case 5. Preferably, the seat 13b may have a complementary shape to the cylindrical bodies 5d so as to house them.

Conveniently, the electronic system 12 may preferably comprise an operator interface 18, such as a control panel and/or a display or similar, by means of which the operator can control/select a brake disk analysis function to determine brake disk condition information 2 and a tyre analysis function to determine information on the condition of the tyre 3. Conveniently, the electronic system 12 may further comprise a control electronic device 16, which is configured to communicate electronically with the optoelectronic assembly 6 to receive from it the electrical signal/data indicative of the image captured. The electronic control device 16 is configured to implement, preferably selectively, the brake disk analysis function and/or the tyre analysis function based on the selection made by the operator.

Conveniently, the electronic control device 16 and the operator interface 18 may be part of a computer appliance 20 separate from the optoelectronic apparatus 4. It is understood that the computer appliance 20 may comprise any electronic device, which has at least one electronic microprocessor able to run a data/signal processing algorithm. Conveniently, the computer appliance 20 and the optoelectronic apparatus 4 can be configured in such a way as to communicate with each other through a data communication system 60, preferably wireless. Conveniently, the electronic system 12 can be provided with at least two communication modules 61 preferably of the known wireless type (e.g., Bluetooth modules or similar) installed in the computer appliance 20 and in the case 5 of the optoelectronic apparatus 4, respectively. It is understood that the data communication according to the present invention is not limited to wireless communication but may include a wired communication. It is also understood that the present invention is not limited to an electronic system 12 provided with a computer appliance 20 separate from the optoelectronic apparatus 4, but may provide for alternative solutions in which the electronic system 12, for example, the electronic control device 16 and the operator interface 18 are both integrated/included in the optoelectronic apparatus 4, preferably in the case 5.

According to a preferred embodiment shown in FIGS. 1, 3 and 5, the optoelectronic apparatus 4 may preferably be configured so as to emit a pilot planar luminous beam 22 (similar to the beam 18) to project onto the brake disk 2 or onto the tread 3*a* a pilot luminous line 23. In use, the pilot luminous line 23 may be indicative of a state of correctness of the measure. Through direct observation of the pilot luminous line 23 projected onto the brake disk 2 or onto the tread 3, the operator can determine in advance if the subsequent projection of the line 22 can be carried out in a correct measurement condition. The correct measurement condition may be associated with the projection of the beam of light 7 on a predetermined/portion of the brake disk 2/tread 3*a*, and/or a correct direction of the line 8 on the brake disk 2/tread 3, for example radial, and/or the absence of debris on the tread 3*a* or on the brake disk 2 that could affect the measurement. To such purpose, the pilot luminous beam 22 may be emitted in advance, i.e. before the luminous beam 7.

Conveniently, the planar pilot luminous beam 22 can be emitted in response to a command given by the operator, for example by means of a control device 24, for example a push-button, present in the apparatus 4. Conveniently, the pilot luminous beam 22 may be emitted in response to a predetermined actuation criterion of the push-button based preferably on the duration of the pressure exerted on the button and/or based on repeated pressing of the same.

According to a possible embodiment shown in FIG. 11, the multi-function system 1 may be provided with a calibration module 30 by means of which it is possible to perform an electro-optical self-calibration of the optoelectronic apparatus 4. Conveniently, the calibration module 30 may comprise a plate-shaped base 31 having a greater calibration surface 31*a* having a predetermined calibration cross-section. For example, the calibration cross section may be grooved with a rectangular tooth profile.

Conveniently, the calibration module 30 may comprise a seat 32 placed on a central column 31*b* shaped to support and house the axial end of the case 5 so as to ensure that the optoelectronic assembly 6 is located at, and at a calibration distance from, the upper calibration surface 31*a*.

In use, the optoelectronic apparatus 4 can be arranged with the axial end (lower in the attached Figures), resting in the seat 32. Conveniently the optoelectronic assembly 6 may emit, in response to an activation command of a self-calibration procedure, a beam of light 7 against the upper calibration surface 31*a* so as to project on it a sample luminous line R, capture the image containing the projected sample luminous line R, and provide it to the electronic system 12. The self-calibration procedure may provide that the electronic system 12 determines the operating status of the optoelectronic apparatus 4 based on the sample luminous line R. The self-calibration procedure implemented by the electronic system 12 may include a series of calibration operations that regulate one or more electrical/optical parameters characterising the operation of the optoelectronic assembly 6 based on the determined operating status. For example, the calibration operations may be performed based on the outcome of an electronic/mathematical comparison between the sample luminous line R detected and a predetermined reference line. It is understood that the self-calibration procedure of the optoelectronic apparatus 4 may provide for the determination of measurement errors for example based on the aforesaid comparison, and the adjustment of the electrical/optical parameters of the optoelectronic apparatus 4 affecting the measurement, so as to zero the errors determined. It is understood that the self-calibration procedure may therefore comprise a "self-zero" algorithm configured to be loaded and implemented by the electronic control device 16 to adjust the electrical/optical parameters to zero the errors determined.

The calibration module 30 advantageously allows the operator to easily, automatically and quickly recalibrate the apparatus 8 thus ensuring a high accuracy of the measurements.

The system 1 may further comprise a magnetic coupling system designed to promote and/or maintain the coupling between the angular adapter member 13 and the case 5 during the measurement of the tread 3*a*. Preferably, the magnetic coupling system may comprise magnetic coupling elements 15 integrated in the supporting surface 5*a* preferably at the axial end of the case and/or at the coupling end of the angular adapter member 13. Conveniently, the magnetic coupling elements 15 may comprise magnets, e.g., neodymium magnetic discs or any similar magnet.

The functioning method of the optoelectronic apparatus 4 will be described below. The operator can select through the operator interface 18 the brake disk analysis function or the tyre analysis function. In the case of selecting the brake disk analysis function, the operator manually grasps the case 5 and places it with its supporting surface 5*a* preferably made on the axial end, resting on the surface 2*a* of the brake disk 2 of the stationary wheel (not rotating) (FIGS. 1, 2 and 3). In response to an operator command given for example via the control device 24, the optoelectronic group 6 may preferably emit the pilot luminous beam 22 so as to project the pilot luminous line 23 on the brake disk 2 (stationary). The operator can then verify the correct measurement condition by observing the pilot line 23. By merely observing the pilot line 23 projected onto the brake disk 2, the operator can conveniently detect an incorrect projection of the line and/or the presence of debris etc. on the same, and adjust and/or reposition the apparatus 4 on the brake disk 2 to improve the accuracy of the measurement. The optoelectronic group 6 may interrupt the emission of the pilot luminous beam 22 (e.g., after a predetermined time), and the operator can control for example using the push-button 24 the emission of the luminous beam 7 against the brake disk 2. The optoelectronic group 6 captures an image containing the luminous line 8 projected onto the stationary brake disk 2 (non-rotating) and communicates it in digital format, in the form of data or encoded in electrical signals, to the electronic system 12. It is understood that checking of the brake disk condition 2 requires that the optoelectronic apparatus 4 is manually positioned on the "stationary" brake disk 2 so that the pilot luminous line 23 and/or the luminous line 8 are projected onto the face of the brake disk 2 in an approximately radial direction to the same (FIG. 3). The electronic system 12 processes the data/signals associated with the image received so that the luminous line 8 can be determined and processed by the brake disk algorithm to determine the brake disk profile 2. Conveniently, the electronic system 12 determines the brake disk condition information based on the brake disk profile, and can provide it to the operator via the operator interface 18, based on the operator's requirements.

Figure 4:
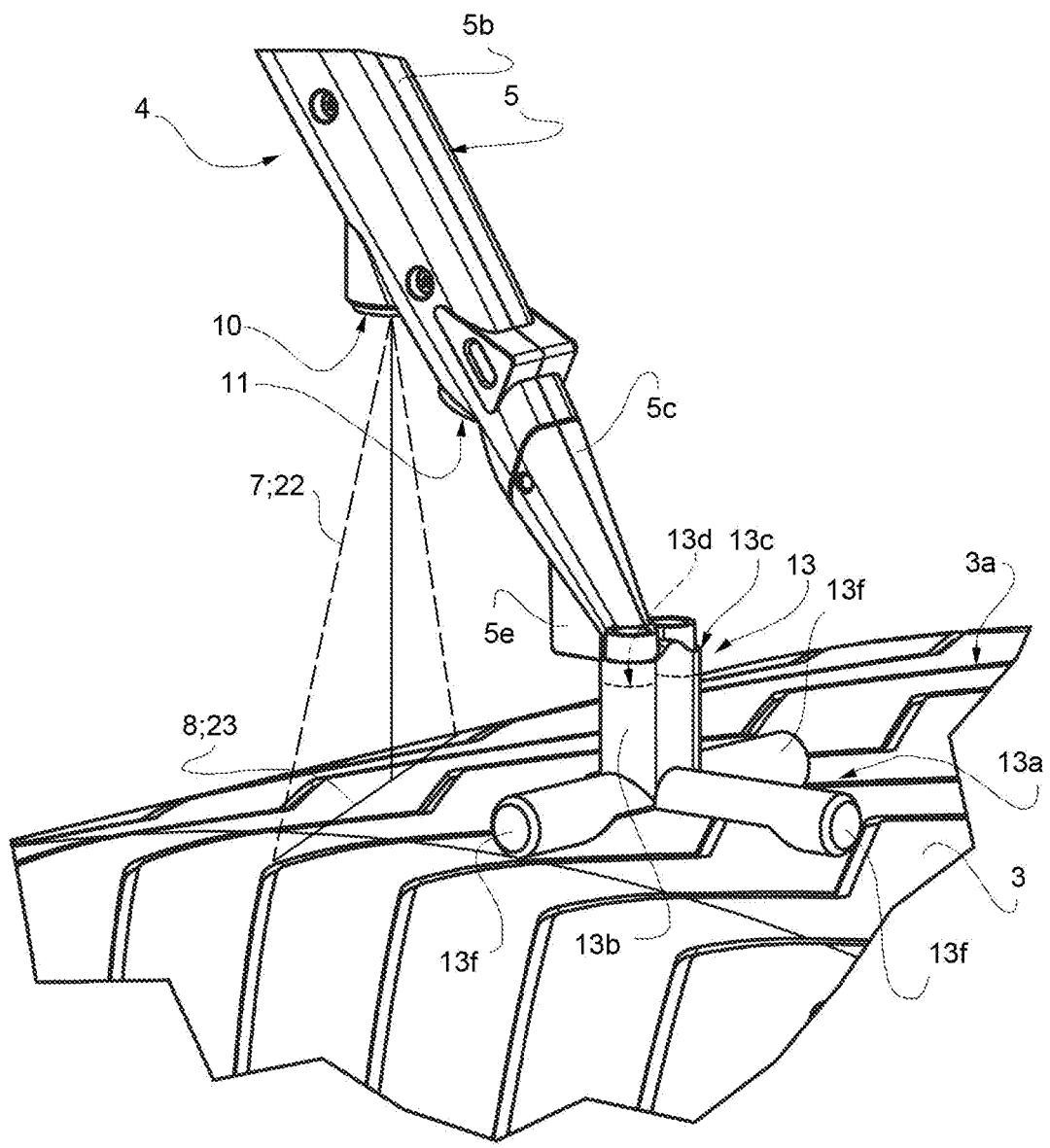
FIG. 4 is a perspective view with parts enlarged for clarity of the multi-function apparatus provided with an angular adaptor device arranged to rest on the tread of a tyre.

In the event instead in which it is necessary to determine the information associated with the tyre profile, the operator can easily mount/couple the angular adapter member 13 onto the case 5 (FIG. 1 on the right, FIGS. 4 and 5), and select through the operator interface 18 a tyre control function. The operator manually arranges the apparatus 4 with the angular adapter member 13 resting on the tread 3a of the tyre 3 of the stationary (not rotating) wheel (FIG. 4). In this case too, similarly to what was said above for the brake disk 2, the optoelectronic apparatus 4 may preferably project the pilot luminous line 23 on the tread 3a, and the operator can verify the correct measurement condition simply by observing said pilot line 23. Similarly, the optoelectronic apparatus 6 may interrupt the emission of the pilot luminous beam 22 (e.g. after a predetermined time) and, preferably in response to an operator command, generated for example by means of the push-button 24, the apparatus 4 can emit the luminous beam 7 against the tread 3a of the tyre 3 (stationary). The apparatus 4 captures/determines the image containing the luminous line 8 projected on the tread 3a and communicates it in the form of data or signals to the electronic system 12. The electronic system 12 processes the received image so as to determine the tread profile 3a and preferably provides the operator with the information associated with the condition of the tread, e.g. through the interface device 18.

The method described above may also provide for the performance of the calibration procedure of the optoelectronic apparatus 4 using the calibration module 30 as described above.

The method may further comprise the step of storing the images of the brake disk 2 or of the tread 3 images captured during the procedure to determine the profile. These images can be stored in a storage device of the electronic system 12, for example in the form of digital photos each associated with a series of data indicative of the performance of the profile measurement. The data may include for example an identification code of the brake disk 2 or tread 3a and/or a date of performance of the measurement, and/or identification data of the performer of the profile measurement operation, or other similar data. The photos/data stored during the procedures can conveniently be used to certify (track) the actual state of a brake disk and/or a tread of a vehicle at a given measurement time, to verifiers/certifying bodies/insurers.

The advantages of the multi-function system described above are evident. The system allows the car mechanic to perform using a single portable device and by mounting/dismounting onto the same as a simple and economical adapter member, the measurement of the tyre and brake disk profiles so as to obtain information on the consumption/damage of the same. The apparatus can be used directly on the wheel mounted on the vehicle and therefore eliminates the need to remove the wheel. In addition, the apparatus can measure the brake disc/tread profile on a stationary wheel thus eliminating the need to use machines to rotate the wheel.

Lastly, it is clear that modifications and variants may be made to the system, appliance and method described and illustrated herein while remaining within the scope of the present invention defined by the appended claims.

The invention claimed is:

1. A multi-function system (1) to determine the profile of a brake disk (2) and the profile of the tread (3a) of a tyre (3); the multi-function system (1) being characterized in that it comprises:
   a hand-held optoelectronic apparatus (4) comprising in turn: an optoelectronic assembly (6) configured to emit a beam of light (7) along an optical emission axis (OE) so as to project onto the brake disk (2) and/or onto the tread (3a) a luminous line (8) and capture an image containing said luminous line (8) projected; a tubular case (5) which can be gripped by hand, which contains/integrates said optoelectronic assembly (6) and is designed to be arranged resting on the brake disk (2) during determination of the profile of the brake disk (2); and an adapter member (13) designed to be coupled in a stable but easily removable manner to said case (5) to be arranged resting on the tread (3a) during determination of the profile of the tread (3a);
   electronic means (12) configured to receive said image and determine the profile of the brake disk (2) and/or the profile of the tread (3a) on the basis of the luminous line (8) contained in said image.

2. The multi-function system according to claim 1, wherein said case (5) has a supporting surface (5a) shaped so that when the supporting surface (5a) rests on the brake disk (2), said optical emission axis (OE) forms a first predetermined angle of incidence (α) with the brake disk (2), and wherein said adapter member (13) is structured in such a way that when the adapter member (13) is arranged resting on the tread (3a), the optical emission axis (OE) forms a second predetermined angle of incidence (β) with respect to the tread (3a) itself.

3. The multi-function system according to claim 1, wherein said adapter member (13) comprises a portion which rests on the tread (3a) and comprises a T-shaped body, or a discoid body, or a wedge-shaped body.

4. The system according to claim 1, comprising magnetic coupling means (15) designed to magnetically retain said adapter member (13) coupled to said case (5).

5. The system according to claim 1, wherein said case (5) has an elongated tubular shape along a longitudinal axis (A), and wherein said supporting surface (5a) is formed in the axial end of said case (5).

6. The system according to claim 1, wherein said optoelectronic apparatus (4) is configured to emit a pilot light beam (22) to project onto the brake disk (2) or onto the tread (3a) a pilot luminous line (23) indicative of a state of correctness of the measurement of the profile.

7. The multi-function system according to claim 1, provided with a calibration module (30) comprising a plate-like base (31) having an upper calibration surface (31a); said optoelectronic apparatus (4) being configured to emit a beam of light (7) against said upper calibration surface (31a) so as to project a sample luminous line (R), capture the image containing the sample luminous line (R) and carry out a self-calibration procedure of the optoelectronic apparatus (4) on the basis of said sample luminous line (R).

8. A multi-function portable (1) optoelectronic apparatus (4) to determine the profile of a brake disk (2) and the profile of the tread (3a) of a tyre (3); the optoelectronic apparatus (4) being characterized in that it comprises:

an optoelectronic assembly (6) configured to emit a laminar beam of light (7) along an optical emission axis (OE) so as to project onto the brake disk (2) and/or onto the tread (3a) a luminous line (8) and acquire an image containing said luminous line (8) projected;

a tubular case (5) which can be gripped by hand, which contains said optoelectronic assembly (6) and is designed to be arranged resting on the brake disk (2) during determination of the profile of the brake disk (2);

and an adapter member (13) designed to be coupled in a stable but easily removable manner to said case (5) and to be arranged resting on the tread (3a) during determination of the profile of the tread (3a); electronic means (12) configured to receive said image and determine the profile of the brake disk (2) and/or the profile of the tread (3a) on the basis of the luminous line (8) contained in said image.

9. The apparatus according to claim 8, wherein said case (5) has a supporting surface (5a), which is shaped so that when the supporting surface (5a) rests on the brake disk (2), the optical emission axis (OE) forms a first predetermined angle of incidence ($\alpha$) with the brake disk (2), said angular adapter member (13) being structured in such a way that when adapter member (13) is arranged resting on the tread (3a), the optical emission axis (OE) forms a second predetermined angle of incidence ($\beta$) with respect to the tread (3a).

10. A method to determine the profile of a brake disk (2) and the profile of the tread (3a) of a tyre (3) by means of a hand-held optoelectronic apparatus (4) comprising an optoelectronic assembly (6) configured to emit a laminar beam of light (7) along an optical emission axis (OE) thus projecting onto the brake disk (2) and/or onto the tread (3a) a luminous line (8) and capturing an image containing said luminous line (8) projected, a tubular case (5) which can be gripped by hand and containing said optoelectronic assembly (6), and an adapter member (13) designed to be coupled in a stable but easily removable manner to said case (5); said method being characterized in that it comprises the steps of:

arranging said supporting surface (5a) of said case (5) resting on said brake disk (2) to determine the surface profile of said brake disk (2);

coupling to said case (5) said adapter member (13) and arranging the latter resting on the tread (3a) to determine the profile of the tyre (3); and determining the profile of the brake disk (2) or the profile of the tread (3a) on the basis of the luminous line (8) contained in said image.

* * * * *